Figure 1:
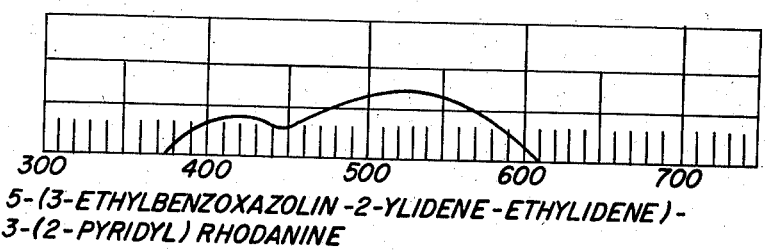

June 17, 1958

E. B. KNOTT 2,839,404

TRINUCLEAR OPTICAL SENSITIZING DYES AND
PHOTOGRAPHIC EMULSIONS CONTAINING THEM

Filed Oct. 12, 1955

5-(3-ETHYLBENZOXAZOLIN-2-YLIDENE-ETHYLIDENE)-
3-(2-PYRIDYL)RHODANINE 5-(3-ETHYLNAPHTHA-2':1'-4:5-OXAZOLIN-2-YLIDENE-
ETHYLIDENE)-3-(2-PYRIDYL)RHODANINE 5-(3-ETHYLNAPHTHA -1':2'-4:5-THIAZOLIN-2-YLIDENE-BUTA-
2":4"-DIENYLIDENE)-3-(2-PYRIDYL)RHODANINE

EDWARD B. KNOTT
INVENTOR.

BY

ATTORNEYS

United States Patent Office 2,839,404
Patented June 17, 1958

2,839,404

TRINUCLEAR OPTICAL SENSITIZING DYES AND PHOTOGRAPHIC EMULSIONS CONTAINING THEM

Edward B. Knott, Harrow, England, assignor to Eastman Kodak Company, Rochester, N. Y., a corporation of New Jersey Application October 12, 1955, Serial No. 540,080

12 Claims. (Cl. 96—105)

This invention relates to new merocyanine dyes and photographic silver halide emulsions sensitized therewith. More particularly, this invention relates to new merocyanine dyes containing a rhodanine nucleus, having on the nitrogen atom thereof a pyridyl or a quinolyl substituent.

Accordingly, it is an object of my invention to provide new merocyanine dyes containing a rhodanine nucleus. Another object is to provide methods for making these new merocyanine dyes. Still another object is to provide photographic silver halide emulsions sensitized with these new merocyanine dyes. Another object is to provide new intermediates useful in preparing these merocyanine dyes and methods for making these new intermediates. Other objects will become apparent from a consideration of the following description and examples.

The new merocyanine dyes of my invention can advantageously be represented by the following general formula:

I

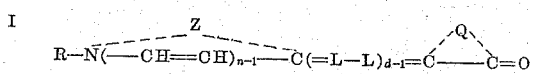

wherein R represents an alkyl group, such as methyl, ethyl, n-propyl, isopropyl, n-butyl, isobutyl, n-amyl, carboxymethyl, β-carboxyethyl, carbomethoxymethyl, carbethoxymethyl, β-hydroxyethyl, β-methoxyethyl, allyl (vinylmethyl), benzyl (phenylmethyl), etc. (e. g., an alkyl group of the formula $C_mH_{2m+1}$ wherein $m$ represents a positive integer of from 1 to 4), $d$ represents a positive integer of from 1 to 3, $n$ represents a positive integer of from 1 to 2, L represents a methine group (i. e., a —CR′= group wherein R′ is a hydrogen atom or a monovalent organic substituent, such as methyl, ethyl, methoxyl, ethoxyl, etc.), Q represents the non-metallic atoms necessary to complete a heterocyclic nucleus of the rhodanine series, said heterocyclic nucleus having a pyridyl or quinolyl substituent (e. g., 2-pyridyl, 3-pyridyl, 4-pyridyl, 6-methyl-2-pyridyl, 4-methyl-2-pyridyl, 3-quinolyl, etc.) attached to the nitrogen atom thereof, and Z represents the non-metallic atoms necessary to complete a heterocyclic nucleus containing from 5 to 6 atoms in the heterocyclic ring, such as those selected from the group consisting of those of the thiazole series (e. g., thiazole, 4-methylthiazole, 5-methylthiazole, 4-phenylthiazole, 5-phenylthiazole, 4,5-dimethylthiazole, 4,5-diphenylthiazole, 4-(2-thienyl)-thiazole, etc.), those of the benzthiazole series (e. g., benzthiazole, 4-chlorobenzthiazole, 5-chlorobenzthiazole, 6-chlorobenzthiazole, 7-chlorobenzthiazole, 4-methylbenzthiazole, 5-methylbenzthiazole, 6-methylbenzthiazole, 5-bromobenzthiazole, 6-bromobenzthiazole, 4-phenylbenzthiazole, 5-phenylbenzthiazole, 4-methoxybenzthiazole, 5-methoxybenzthiazole, 6-methoxybenzthiazole, 5-iodobenzthiazole, 6-iodobenzthiazole, 4-ethoxybenzthiazole, 5-ethoxybenzthiazole, tetrahydrobenzthiazole, 5,6-dimethoxybenzthiazole, 5,6-dioxymethylenebenzthiazole, 5-hydroxybenzthiazole, 6-hydroxybenzthiazole, etc.), those of the naphthothiazole series (e. g., α-naphthothiazole (i. e., [2,1]-naphthothiazole), β-naphthothiazole (i. e., [1,2]-naphthothiazole), 5-methoxy-β-naphthothiazole, 5-ethoxy-β-naphthothiazole, 7-methoxy-α-naphthothiazole, 8-methoxy-α-naphthothiazole, etc.), those of the thianaphtheno-7′,6′,4,5-thiazole series (e. g., 4′-methoxythianaphtheno-7′,6′,4,5-thiazole, etc.), those of the oxazole series (e. g., 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e. g., benzoxazole, 5-chlorobenzoxazole, 5-phenylbenzoxazole, 5-methylbenzoxazole, 6-methylbenzoxazole, 5,6-dimethylbenzoxazole, 4,6-dimethylbenzoxazole, 5 - methoxybenzoxazole, 6-methoxybenzoxazole, 5-ethoxybenzoxazole, 6-chlorobenzoxazole, 5-hydroxybenzoxazole, 6-hydroxybenzoxazole, etc.), those of the naphthoxazole series (e. g., α-naphthoxazole, β-naphthoxazole, etc.), those of the selenazole series (e. g., 4-methylselenazole, 4-phenylselenazole, etc.), those of the benzselenazole series (e. g., benzselenazole, 5-chlorobenzselenazole, 5-methoxybenzselenazole, 5-hydroxybenzselenazole, tetrahydrobenzselenazole, etc.), those of the naphthoselenazole series (e. g., α-naphthoselenazole, β-naphthoselenazole, etc.), those of the thiazoline series (e. g., thiazoline, 4-methylthiazoline, etc.), those of the 2-quinoline series (e. g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e. g., quinoline, 6-methoxyquinoline, 7-methylquinoline, 8-methylquinoline, etc.), those of the 1-isoquinoline series (e. g., isoquinoline, 3,4-dihydroisoquinoline, etc.), those of the 3,3-dialkylindolenine series (e. g., 3,3-dimethylindolenine, 3,3,5-trimethylindolenine, 3,3,7-trimethylindolenine, etc.), those of the 2-pyridine series (e. g., pyridine, 3-methylpyridine, 4-methylpyridine, 5-methylpyridine, 6-methylpyridine, 3,4-dimethylpyridine, 3,5-dimethylpyridine, 3,6-dimethylpyridine, 4,5-dimethylpyridine, 4,6-dimethylpyridine, 4-chloropyridine, 5-chloropyridine, 6-chloropyridine, 3-hydroxypyridine, 4-hydroxypyridine, 5-hydroxypyridine, 6-hydroxypyridine, 3-phenylpyridine, 4-phenylpyridine, 6-phenylpyridine, etc.), those of the 4-pyridine series (e. g., 2-methylpyridine, 3-methylpyridine, 2-chloropyridine, 3-chloropyridine, 2,3-dimethylpyridine, 2,5-dimethylpyridine, 2,6-dimethylpyridine, 2-hydroxypyridine, 3-hydroxypyridine, etc.), etc.

According to my invention, I provide the new dyes represented by Formula I above wherein $d$ represents 1 by reacting together a cyclammonium quaternary salt selected from those represented by the following general formula:

II

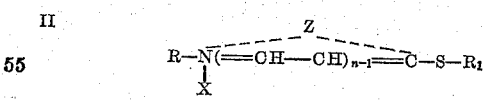

wherein R, n, and Z each have the values given above, $R_1$ represents an alkyl group (e. g., methyl ethyl, etc.) or an aryl group (e. g., phenyl, o-, m-, and p-tolyl, etc.), and X represents an acid anion, e. g., chloride, bromide, iodide, thiocyanate, sulphamate, methylsulphate, ethylsulphate, perchlorate, benzenesulphonate, p-toluenesulphonate, etc., with a compound selected from those represented by the following general formula:

III

wherein Q has the values given above.

The new dyes of my invention represented by Formula I above wherein $d$ represents 2 or 3 can be prepared by condensing a cyclammonium quaternary salt selected from those represented by the following general formula:

IV 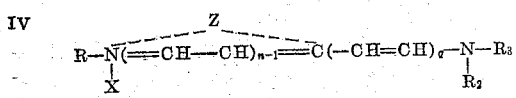

wherein R, n, X, and Z each have the values given above, q represents a positive integer of from 1 to 2, $R_2$ represents an acyl group (e. g., acetyl, propionyl, benzoyl, etc.), and $R_3$ represents an aryl group (e. g., phenyl, o-, m-, and p-tolyl), together with a compound selected from those represented by Formula III.

The condensations of the compounds of Formula III with those of Formula II (or IV) can advantageously be accelerated by heating the reaction mixture, generally temperatures varying from ambient temperature (ca. 20° C.) to the reflux temperature of the reaction mixture being satisfactory. The condensations can be carried out in the presence of an inert solvent, such as pyridine, nitrobenzene, ethanol, n-propanol, isopropanol, n-butanol, etc.

The condensations of the compounds of Formula III with those of Formula II (or IV) can advantageously be carried out in the presence of a basic condensing agent, such as the trialkylamines (e. g., triethylamine, tri-n-propylamine, triisopropylamine, tri-n-butylamine, triisobutylamine, tri-n-amylamine, etc.), N-alkylpiperidines (e. g., N-methylpiperidine, N-ethylpiperidine, etc.), N,N-dialkylanilines (e. g., N,N-dimethylaniline, diethylaniline, etc.), etc.

Particularly useful merocyanine dyes selected from those represented by Formula I above comprise those dyes represented by the following general formula:

V 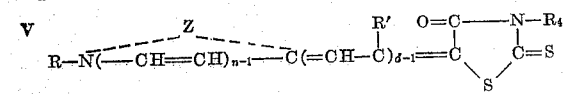

wherein R, R′, n, d (R′ is H when d is 3) and Z each have the values given above, and $R_4$ represents a pyridyl or quinolyl radical (as set forth above).

The preparation of the compounds represented by Formula V requires, in addition to the compounds represented by Formulas II and IV above, an intermediate selected from those represented by the following general formula:

VI 

wherein $R_4$ is a pyridyl or quinolyl radical as defined above.

The compounds represented by Formula VI above can advantageously be prepared by cyclizing a compound selected from those represented by the following general formula:

VII 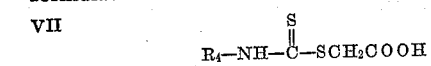

wherein $R_4$ has the values given above, by dissolving compounds of Formula VII in an organic dehydrating agent, e. g., acetic anhydride, over a free flame or on a steam bath. The compounds of Formula VII can be prepared by condensing an alkali metal salt of chloroacetic acid together with an intermediate having the formula:

VIII 

wherein $R_4$ has the values given above and M represents an alkali metal atom, e. g., sodium, or an ammonium radical ($NH_4$ or organic amine radical, such as triethylammonium). The intermediates of Formula VIII can advantageously be prepared by the method described in my copending application Serial No. 531,385, filed August 10, 1955.

When an alkyl ortho ester, e. g., ethyl orthoformate, ethyl orthoacetate, etc., is included in the cyclization reaction mixture comprising a compound selected from those represented by Formula VII, an intermediate results having the following general formula:

IX 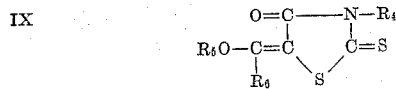

wherein $R_4$ has the values given above, $R_5$ represents a lower alkyl radical, e. g., methyl, ethyl, etc., and $R_6$ represents a hydrogen atom or a lower alkyl group, e. g., methyl, ethyl, etc. The intermediates of Formula IX can be condensed with an intermediate of Formula II or IV to provide dyes of Formula I having a chain alkoxyl group, e. g., according to the process described in my co-pending application Serial No. 309,743, filed September 15, 1952, now U. S. Patent 2,743,273, issued April 24, 1956. Orthoesters useful in preparing the intermediates of Formula IX comprise those represented by the following general formula:

X $$R_6-C(OR_5)_3$$

wherein $R_5$ and $R_6$ have the values given above.

The compounds represented by Formula I (or V) wherein R represents a substituted alkyl group can advantageously be prepared by condensing a compound represented by the following general formula:

XI 

wherein R, X, Z and n each have the values given above with one of the intermediates represented by Formula III in U. S. Patent 2,186,608. The intermediates of Formula IX can also be condensed with those of Formula XI to produce useful merocyanine dyes, according to the method described in British Patent 544,647, accepted April 22, 1942.

The following examples will serve to illustrate the manner of preparing the new merocyanine dyes of my invention and the intermediates required for their preparation.

*Example 1.—Carboxymethyl N-(2-pyridyl) dithiocarbamate*

Triethylammonium N - (2 - pyridyl)dithiocarbamate (5.4 g.) was dissolved in water (30 cc.) and a solution of sodium chloroacetate (2.4 g.) in water (10 cc.) was added. The mixture was stood overnight and acidified with dilute acetic acid. The yellow grains (3.2 g., 70%) were washed with water, air dried and recrystallized from ethanol as hard yellow aggregates, M. P. 133° C. (effervescence).

*Example 2.—3-(2-pyridyl)rhodanine*

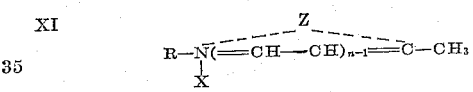

Carboxymethyl N-(2-pyridyl)dithiocarbamate (1 part) and acetic anhydride (10 parts) were heated together on a steam bath for 30 minutes and the solvent distilled off under reduced pressure. The residual orange tar was dissolved in isopropanol to give a solution which on prolonged standing deposited crystals of the required substance. It formed straw colored needle rosettes, M. P. 77° C., from isopropanol.

Example 3.—5-1'-ethoxyethylidene-3-(2-pyridyl)rhodanine

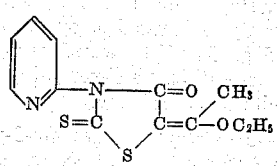

Carboxymethyl N-(2-pyridyl)dithiocarbamate (22.8 g.), acetic anhydride (200 cc.) and ethyl orthoacetate (50 cc.) were heated together on a steam bath for 1 hour. The solvents were removed, ethanol (25 cc.) was added and the whole chilled. The crystals which were contaminated with a tar weighed 13.0 g. From isopropanol, it (9.1 g.) formed dark red crystals. A sample from cyclohexane, then from benzene, formed rose colored flakes, M. P. 137–138° C.

Example 4.—5-(3-ethylbenzoxazolin-2-ylidene-ethylidene)-3-(2-pyridyl)rhodanine

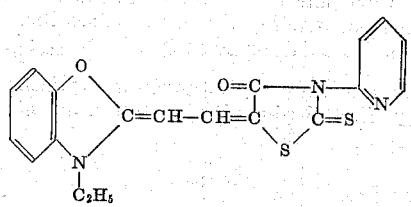

Carboxymethyl N-(2-pyridyl)dithiocarbamate (1.1 g.) was cyclized as in Example 2. To the tar was added 2-2'-acetanilidovinylbenzoxazole ethiodide (2.2 g.), ethanol (20 cc.) and triethylamine (1.5 cc.) and the whole was refluxed for 15 minutes. The solution was chilled and the dye collected. From pyridine-methanol it (1.1 g., 60%) formed magenta needles, M. P. 262° C.

It sensitized a silver chlorobromide emulsion strongly with a flat peak at 560–580 m$\mu$.

Example 5.—5-(3-methylthiazolidin-2-ylidene-ethylidene)-3-(2-pyridyl)rhodanine

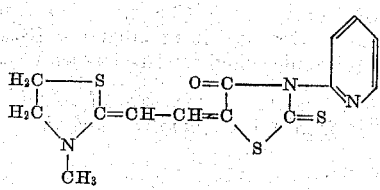

Carboxymethyl N-(2-pyridyl)dithiocarbamate (1.1 g.) was cyclized as in Example 2. To the tar were added 2-2'-acetanilido-vinylthiazoline methiodide (1.95 g.), ethanol (20 cc.) and triethylamine (1.5 cc.) and the whole was refluxed for 5 minutes. The dye separated rapidly and was collected after chilling. It (0.9 g., 55%) formed soft red needles, M. P. 219° C. from pyridineethanol.

It sensitized a silver chlorobromide emulsion strongly with a peak at 550 m$\mu$.

Example 6.—5-(3-ethylnaphtha-2':1'-4:5-oxazolin-2-ylideneethylidene)-3-(2-pyridyl)rhodanine

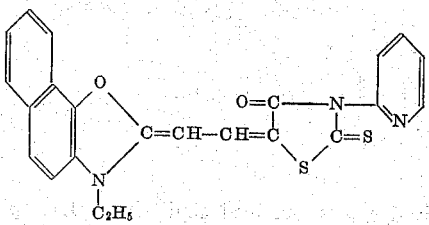

This dye was obtained similarly from 2-2''-acetanilidovinylnaphtha-2':1'-4:5-oxazole ethiodide (2.4 g.) in 54% yield. It formed magenta flakes or needles, M. P. 261–262° C., from pyridineethanol.

It sensitized a silver chlorobromide emulsion strongly with peaks at 530 and 580 m$\mu$.

Example 7.—5-(3-ethylbenzothiazolin-2-ylidene-but-2'-enylidene)-3-(2-pyridyl)rhodanine

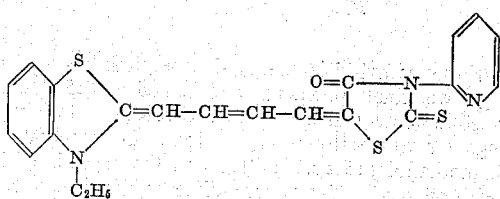

Carboxymethyl N-(2-pyridyl)dithiocarbamate (2.3 g.) was cyclised as in Example 2. To the tar was added 2-4'-acetanilido-buta-1':3'-dienylbenzothiazole ethiodide (4.75 g.), ethanol (25 cc.) and triethylamine (3 cc.) and the whole was refluxed for 15 minutes. The dye was collected after chilling, and dried and extracted with benzene in a Soxhlet apparatus. The benzene was distilled off and the residual dye recrystallized from pyridine-methanol. It (1.4 g., 33%) formed steel-blue flakes, M. P. 265° C. It sensitized a silver chlorobromide emulsion with maxima at 620 and 700 m$\mu$.

Example 8.—5-(3-ethylnaphtha-2':1'-4:5-thiazolin-2-ylidenebut-2''-enylidene)-3-(2-pyridyl)rhodanine

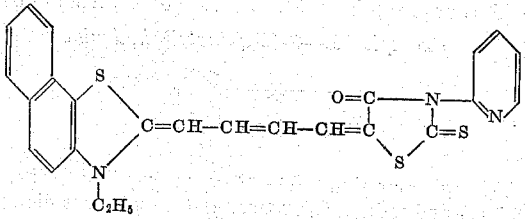

This dye was obtained similarly to that of Example 7, but by using 2-4''-acetanilidobuta-1'':3''-dienylnaphtha-2':1'-4:5-thiazole ethiodide (5.25 g.). It (1.6 g., 17%) formed glossy, green flakes, M. P. 239° C. from pyridine-ethanol. It sensitized a silver chlorobromide emulsion with maxima at 620 and 720 m$\mu$.

Example 9.—5-(3-ethylnaphtha-1':2'-4:5-thiazolin-2-ylidenebut-2''-enylidene)-3-(2-pyridyl)rhodanine

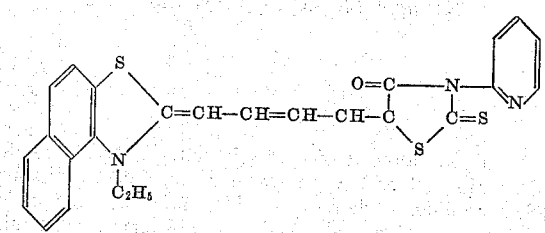

This dye was obtained similarly to that of Example 7 but by using 2-4''-acetanilidobuta-1'':3''-dienylnaphtha-1':2'-4:5-thiazole ethiodide (5.25 g.). It (1.8 g., 37%) formed dark green flakes, M. P. 261° C. from pyridine-methanol. It sensitized a silver chlorobromide emulsion with maxima at 630 and 720 m$\mu$.

Example 10.—Carboxymethyl N-(6-methyl-2-pyridyl)dithiocarbamate

Triethylammonium N-(6-methyl-2-pyridyl)dithiocarbamate (28.5 g.) and sodium chloroacetate (13 g.) were dissolved in water (100 cc.) by warming to 35° C. After 2 hours the yellow solid was filtered off and the filtrate was acidified with dilute acetic acid. The thick, pale yellow precipitate was washed with water and air dried (22.5 g., 93%). A sample formed fawn needles, M. P. 125° C. (effervescence) from ethanol.

Example 11.—3-(6-methyl-2-pyridyl)rhodanine

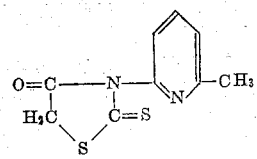

Carboxymethyl N-(6-methyl-2-pyridyl)dithiocarbamate (10 g.) was finely powdered and heated at 125°/10 mm. The solid slowly fused with effervescence to give an orange tar which slowly crystallized. It was boiled up with methanol (15 cc.) chilled and the crystals (4.8 g., 52%) collected. They were dissolved in benzene, the solution was filtered, the solvent removed and the residue crystallized from isopropanol as pink flakes, M. P. 146–148° C.

Example 12.—5-1'-ethoxyethylidene-3-(6-methyl-2 pyridyl)rhodanine

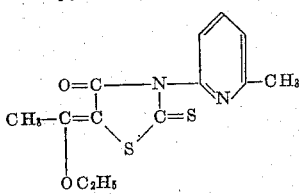

Obtained by the method used in Example 3 in 84% yield as orange prisms, M. P. 165–166° C., from ethanol.

Example 13.—3-(3-quinolyl)rhodanine

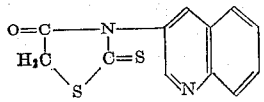

Triethylammonium N-(3-quinolyl)dithiocarbamate (8.0 g.) and sodium chloroacetate (3.0 g.) were dissolved in water (50 cc.) and ethanol (10 cc.) by warming to 30°. It was set aside for 1 hour and diluted with water (200 cc.). After standing overnight the solution was filtered and acidified with dilute acetic acid. The precipitate of carboxymethyl N-(3-quinolyl)dithiocarbamate (4.7 g., 50.7%) was cyclised to the rhodanine either by dissolving it in hot acetic acid or acetic anhydride. The rhodanine formed light brown needles, M. P. 228° C. (decomposes from 215° C.).

Example 14.—3-(3-pyridyl)rhodanine

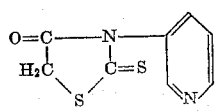

3-aminopyridine (5.0 g.), dioxan (5 cc.) and triethylamine (8 cc.) were warmed together to dissolve. After cooling, carbon disulphide (3.2 cc.) was added to give a rapid separation of a second phase. The mixture was shaken for 2 hours and a solution of sodium chloroacetate (7.0 g.) in water (50 cc.) was added. The solution was heated on a steam bath for 10 minutes, cooled and diluted with water (50 cc.) and acidified with acetic acid. A tar was precipitated which crystallized overnight. It (5.2 g., 46%) formed brown needles, M. P. 156–157° C., from ethanol.

Example 15.—3-(6-methyl-2-pyridyl)-5-(3-methylthiazolidin-2-ylidene-ethylidene) rhodanine

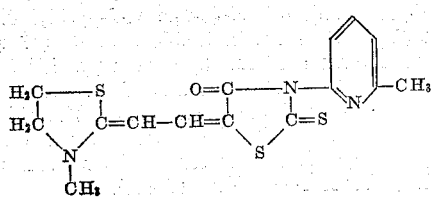

2-2'-acetanilidovinylthiazoline methiodide (1.95 g.), 3-(6-methyl-2-pyridyl) rhodanine (1.12 g.), ethanol (10 cc.) and triethylamine (0.8 cc.) were refluxed for 5 minutes. The dye separated at once. From pyridine-ethanol it (1.65 g., 94.5%) formed orange-red needles, M. P. 273° C. It sensitized a silver chlorobromide emulsion strongly with $\lambda_{max}$. 585 m$\mu$.

Example 16.—5-(3-ethylbenzoxazolin-2-ylidene-ethylidene)-3-(6-methyl-2-pyridyl)rhodanine

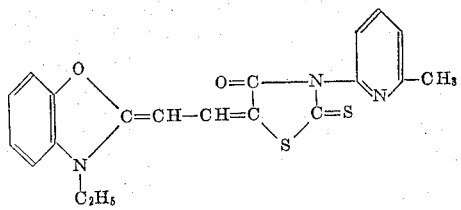

Obtained similarly in 95% yield from 2-2'-acetanilidovinylbenzoxazole ethiodide (2.15 g.) and 3-(6-methyl-2-pyridyl) rhodanine (1.12 g.) as flat, red needles, M. P. 265° C., from pyridine-methanol. It sensitized a silver chlorobromide emulsion strongly with $\lambda_{max}$. 580 m$\mu$.

Example 17.—5-(3-ethylbenzoxazolin-2-ylidene-prop-2'-ylidene)-3-(6-methyl-2-pyridyl)rhodanine

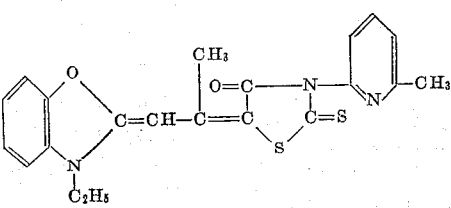

2-methylbenzoxazole ethiodide (1.0 g.), 5-1'-ethoxyethylidene-3-(6-methyl-2-pyridyl) rhodanine (1.0 g.), pyridine (10 cc.) and triethylamine (0.6 cc.) were heated together on a steam bath for 2 hours. Ethanol (10 cc.) and water (20 cc.) were added and the solution was chilled overnight. The crystals were collected and washed with ethanol. It (0.6 g., 43%) formed green flakes, M. P. 196° C., from ethanol. It sensitized a silver chlorobromide emulsion strongly with $\lambda_{max}$. 580 m$\mu$.

Example 18.—5-(3-ethylbenzoxazolin-2-ylidene-ethylidene)-3-(3-quinolyl)rhodanine

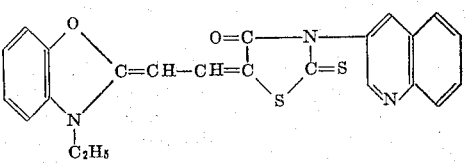

2-2'-acetanilidovinylbenzoxazole ethiodide (1.45 g.), 3-(3-quinolyl)rhodanine (0.9 g.), ethanol (25 cc.) and triethylamine (0.5 cc.) were refluxed for 15 minutes. The dye (1.05 g., 73%) formed a crimson powder, M. P. 267° C. from pyridine-methanol. It sensitized a silver chlorobromide emulsion with $\lambda_{max}$. 500, 530 and 570 m$\mu$.

Example 19.—5-(3-ethylbenzoxazolin-2-ylidene-ethylidene)-3-(3-pyridyl)rhodanine

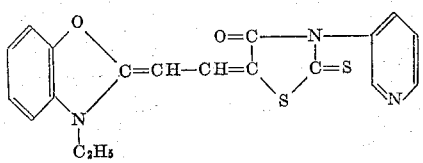

This dye was obtained similarly to Example 1, but using 3-(3-pyridyl)rhodanine (1.0 g.) in 74% yield. It formed flat, magneta needles, M. P. 250–251° C. It sensitized a silver chlorobromide emulsion with $\lambda_{max}$. 480, 520 and 560 m$\mu$.

Example 20.—Carboxymethyl N-(4-pyridyl)dithiocarbamate

Triethylammonium N - (4 - pyridyl)dithiocarbamate (3.4 g.) and sodium chloroacetate (1.5 g.) were dissolved in water (25 cc.) and ethanol (25 cc.) at 30° and the solution was allowed to cool. After 3 hours water (50 cc.) was added and the solution was acidified with dilute acetic acid. On scratching the walls of the flask the acid crystallized. It (2.3 g., 80.5%) formed orange prisms, M. P. 152–153° C. (red, from aqueous acetic acid).

Example 21.—3-(4-pyridyl)rhodanine

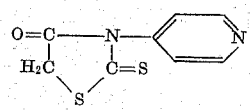

The acid of Example 20 (2.0 g.) and acetic anhydride (10 cc.) were heated together on a steam bath for 10 minutes. Acetic acid (2 cc.) was added followed by water (50 cc.). On neutralizing the solution with solid sodium bicarbonate the rhodanine separated. It (1.2 g., 65%) formed red prisms, M. P. 162–164° C., from ethanol.

Example 22.—5-(3-methylbenzothiazolin-2-ylidene)-3-(2-pyridyl)rhodanine

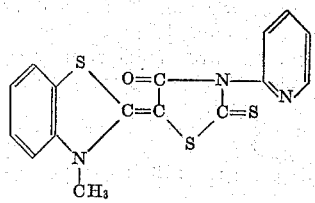

Carboxymethyl N-(2-pyridyl)dithiocarbamate (2.3 g.) and acetic anhydride (15 cc.) were heated together on a steam bath for 15 minutes and the solvent removed under reduced pressure. To the residual oil was added 2-methylthiobenzothiazole methotoluene-p-sulphonate (3.7 g.), ethanol (20 cc.) and triethylamine (1.5 cc.) and the whole was refluxed for 10 minutes on a steam bath. The dye separated at once. It was washed with ethanol and recrystallized from pyridine (600 cc.). It (3.2 g., 89.5%) formed yellow needles, which commenced to decompose at 310° C.

Example 23.—5-(1:2-dihydro-1-methylquinolin-2-ylidene)-3-(2-pyridyl)-rhodanine

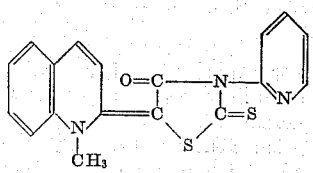

The dye was obtained in exactly the same manner as Example 22 by using 2-methylthioquinoline metho-toluene-p-sulphonate (3.6 g.) instead of the benzothiazolium salt. It (3.2 g., 91%) formed garnet flakes, M. P. 244° C., from pyridine-methanol.

Example 24.—5-(3-methylthiazolidin-2-ylidene)-3-(2-pyridyl)-rhodonine

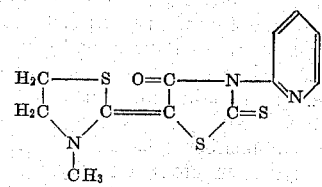

The dye was obtained in the same manner as Example 22 by using 2-methylthiothiazoline metho-toluene-p-sulphonate (3.2 g.) instead of the benzothiazole salt. It (2.3 g., 76%) formed yellow needles, M. P. 229–230° C., from pyridine-methanol.

I have also found that dyes corresponding to those of Formula V above wherein $R_4$ represents a thiazyl group can be prepared. Some of these dyes also optically sensitize photographic silver halide emulsions. The following examples illustrate the preparation of the necessary intermediates and these distinct merocyanine dyes.

Example 25.—Carboxymethyl N-(2-thiazolyl)dithiocarbamate

Triethylammonium N - (2 - thiazolyl)dithiocarbamate (27.7 g.) and sodium chloroacetate (11.6 g.) were dissolved at 55° in water (100 cc.) and ethanol (100 cc.). The solution was allowed to cool and after 10 minutes a mass of yellow needles of the sodium salt of the required acid separated. After 1 hour the solution and crystals were chilled to 5° C. and the needles collected and washed with ethanol. They (23.2 g., 91%) were dissolved in warm water (500 cc.) the solution was filtered and a solution of glacial acetic acid (6 cc.) in water (50 cc.) was added. The required acid separated at once. From acetic acid it formed pale yellow crystals, M. P. 178–179° C. (effervesced, solidified and then melted at 192° C.

Example 26.—3-(2-thiazolyl)rhodanine

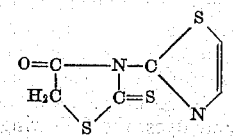

The compound of Example 25 (18 g.) and acetic anhydride (50 cc.) were heated for 30 minutes on a steam bath. The clear solution was decomposed by the addition of acetic acid (10 cc.) then water (200 cc.) to give a thick crystalline meal. The rhodanine (14.1 g., 85%) formed straw colored needles, M. P. 130° C., from ethanol.

Example 27.—5 - 1' - ethoxyethylidene-3-(2-thiazolyl)rhodanine

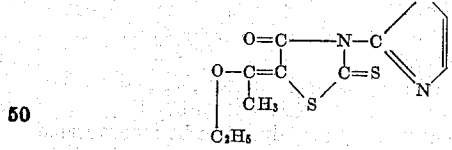

3-(2-thiazolyl)rhodanine (10.9 g.) (or the equivalent amount of the product of Example 21) and acetic anhydride (55 cc.) and ethyl orthoacetate (20 cc.) were refluxed on a gauze for 1 hour. The solvents were removed under reduced pressure and the solid residue was recrystallized from isopropanol. It (11.2 g., 77.5%) formed rust colored needles, M. P. 133° C., falling to 118° C. on further recrystallizing. These two forms may be cis-trans isomers.

Example 28.—5-(3-ethylnaphtho-2':1'-4:5-oxazolin-2-ylidene-ethylidene)-3-(2-thiazolyl)rhodanine

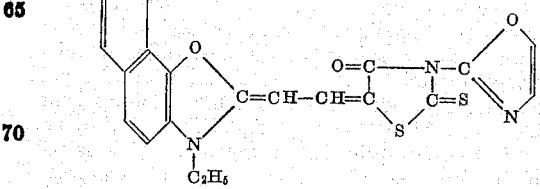

2-2'-acetanilidovinylnaphth-2':1'-4:5-oxazole ethiodide (2.4 g.), 3-(2-thiazolyl)rhodanine (1.1 g.), pyridine (15 cc.) and triethylamine (0.8 cc.) were heated together for 30 minutes on a steam bath. Ethanol (30 cc.) was added and the mixture was chilled. The dye which crystallized (1.5 g., 69%) formed violet crystals, M. P. 266° C., from pyridine-ethanol.

As shown in a number of the above examples, the dyes of my invention are particularly useful in sensitizing photographic silver halide emulsions, serving to alter the sensitivity thereof in a most useful manner. Sensitization by means of my new dye is, of course, directed primarily to the ordinarily employed, gelatino-silver-halide, developing-out emulsions. The dyes are advantageously incorporated in the washed, finished emulsion and should, of course, be uniformly distributed throughout the emulsion. In the preparation of photographic emulsions containing my new dyes, it is only necessary to disperse the dyes in the emulsions. The methods of incorporating dyes in emulsion are simple and well known to those skilled in the art of emulsion making. It is convenient to add the dyes from the solutions in appropriate solvents. The solvent must, of course, be compatible with the emulsion and substantially free from any deleterious effect on the light-sensitive materials. Methanol has proven satisfactory as a solvent for the majority of my new dyes.

The concentration of my new dyes in the emulsion can vary widely, i. e., from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of my new dyes, the following procedure is satisfactory: A quantity of the dye is dissolved in methyl alcohol or other suitable solvent and a volume of this solution (which may be diluted with water) containing from 5 to 100 mgs. of dye is slowly added to about 1000 cc. of a gelatino-silver-halide emulsion, with stirring. Stirring is continued until the dye is uniformly distributed throughout the emulsion. With most of my new dyes, 10 to 20 mgs. of dye per liter of emulsion suffices to produce the maximum sensitizing effect with the ordinary gelatino-silver bromide (including bromiodide) emulsions. With fine-grain emulsions, which include most of the ordinarily employed gelatino-silver-chloride emulsions, somewhat larger concentrations of dye may be necessary to secure the optimum sensitizing effect.

The above statements are only illustrative and are not to be understood as limiting my invention in any sense, as it will be apparent that my new dyes can be incorporated by other methods in many of the photographic silver halide emulsions customarily employed in the art. For instance, the dyes can be incorporated by bathing a plate or film upon which an emulsion has been coated, in the solution of the dye, in an appropriate solvent. Bathing methods, however, are not to be preferred ordinarily.

Photographic silver halide emulsions which can advantageously be sensitized by means of the new dyes of my invention comprise the customarily employed gelatino-silver-chloride, gelatino-silver-chlorobromide, gelatino-silver-bromide, and gelatino-silver-bromiodide developing-out emulsions.

Photographic silver halide emulsions, such as those listed above, containing the sensitizing dyes of my invention can also contain such addenda as chemical sensitizers, e. g., sulfur sensitizers (e. g., allyl thiocarbamide, thiourea, allylisothiocyanate, cystine, etc.), various gold compounds (e. g., potassium chloroaurate, auric trichloride, etc.) (see U. S. Patents 2,540,085; 2,597,856 and 2,597,915), various palladium compounds, such as palladium chloride (U. S. 2,540,086), potassium chloropalladate (U. S. 2,598,079), etc., or mixtures of such sensitizers; anti-foggants, such as ammonium chloroplatinate (U. S. 2,566,245), ammonium chloroplatinite (U. S. 2,566,263), benzotriazole, nitrobenzimidazole, 5-nitroindazole, benzidine, mercaptans, etc. (see Mees—"The Theory of the Photographic Process," Macmillan Pub., page 460), or mixtures thereof; hardeners, such as formaldehyde (U. S. 1,763,533), chrome alum (U. S. 1,763,533), glyoxal (U. S. 1,870,354), dibromoacrolein (British 406,750), etc.; color couplers, such as those described in U. S. Patent 2,423,730, Spence and Carroll U. S. Patent 2,640,776, etc.; or mixtures of such addenda. Dispersing agents for color couplers, such as those set forth in U. S. Patents 2,322,027 and 2,304,940 can also be employed in the above-described emulsions.

Figure 2:
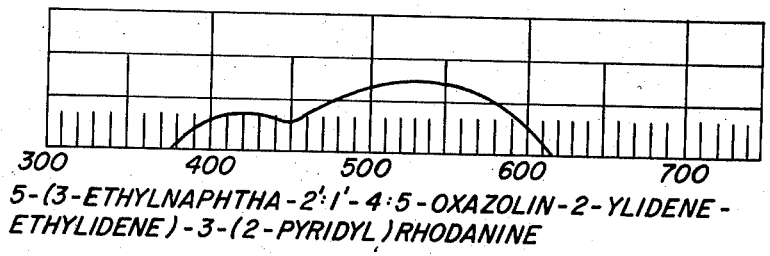
Figure 3:
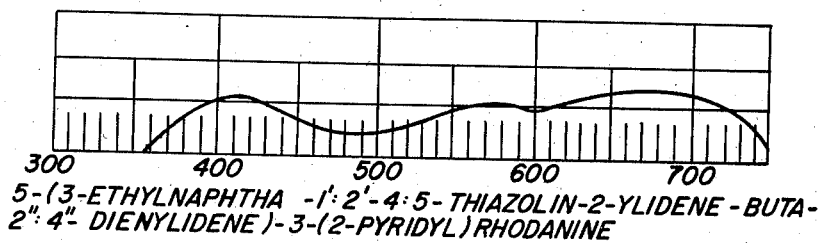

The accompanying drawing further illustrates my invention. Each figure is a diagrammatic reproduction of a spectrogram showing the sensitivity of a gelatino-silver-bromide (specifically silver bromiodide) emulsion containing one of my new trinuclear optical sensitizing dyes. In Fig. 1, the curve depicts the sensitivity of an ordinary gelatino-silver-bromiodide emulsion containing 5-(3-ethylbenzoxazolin-2-ylidene-ethylidene) - 3 - (2-pyridyl) rhodanine. In Fig. 2, the curve depicts the sensitivity of an ordinary gelatino-silver-bromiodide emulsion containing 5-(3-ethylnaphtha-2':1'-4:5-oxazolin-2-ylidene-ethylidene)3-(2-pyridyl)rhodanine. In Fig. 3, the curve depicts the sensitivity of an ordinary gelatino-silver-bromiodide emulsion containing 5-(3-ethylnaphtha-1':2'-4:5-thiazolin-2-ylidene-but-2''-enylidene) - 3 - (2-pyridyl) rhodanine.

What I claim as my invention and desire secured by Letters Patent of the United States is:

1. A photographic silver halide emulsion sensitized with a compound selected from those represented by the following general formula:

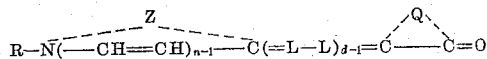

wherein R represents an alkyl group, $d$ represents a positive integer of from 1 to 3, $n$ represents a positive integer of from 1 to 2, L represents a methine group, Z represents the non-metallic atoms necessary to complete a heterocyclic nucleus containing from 5 to 6 atoms in the heterocyclic ring, and Q represents the non-metallic atoms necessary to complete a heterocyclic nucleus of the rhodanine series having a pyridyl or quinolyl substituent attached to the nitrogen atom thereof.

2. A gelatino-silver-halide developing out emulsion sensitized with a compound selected from those represented by the following general formula:

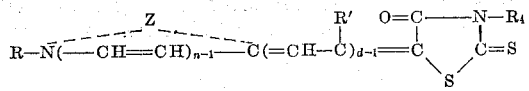

wherein R represents an alkyl group of the formula $C_mH_{2m+1}$ wherein $m$ represents a positive integer of from 1 to 4, $n$ represents a positive integer of from 1 to 2, $d$ represents a positive integer of from 1 to 3, Z represents the non-metallic atoms necessary to complete a heterocyclic nucleus selected from the group consisting of those of thiazole series, those of the benzothiazole series, those of the naphthothiazole series, those of the thianaphtheno-7',6',4,5-thiazole series, those of the oxazole series, those of the benzoxazole series, those of the naphthoxazole series, those of the selenazole series, those of the benzselenazole series, those of the naphthoselenazole series, those of the thiazoline series, those of the 2-quinoline series, those of the 4-quinoline series, those of the 1-isoquinoline series, those of the 3,3-dialkylindolenine series, those of the 2-pyridine series, and those of the 4-pyridine series, $R_4$ represents a member selected from the group consisting of a pyridyl group and a quinolyl group, and R' represents a member selected from the group consisting of a hydrogen atom, an alkyl group containing from 1 to 2 carbon atoms, and an alkoxyl group containing from 1 to 2 carbon atoms when $d$ is a positive integer less than 3 and R' represents a hydrogen atom when $d$ is 3.

3. A gelatino-silver-halide emulsion as defined in claim 2 wherein Z represents the non-metallic atoms necessary to complete a heterocyclic nucleus of the benzthiazole series.

4. A gelatino-silver-halide emulsion as defined in claim 2 wherein Z represents the non-metallic atoms necessary to complete a heterocyclic nucleus of the benzoxazole series.

5. A gelatino-silver-halide emulsion as defined in claim 2 wherein Z represents the non-metallic atoms necessary to complete a heterocyclic nucleus of the naphthothiazole series.

6. A gelatino-silver-halide emulsion as defined in claim 2 wherein Z represents the non-metallic atoms necessary to complete a heterocyclic nucleus of the naphthoxazole series.

7. A gelatino-silver-halide emulsion as defined in claim 2 wherein Z represents the non-metallic atoms necessary to complete a heterocyclic nucleus of the thiazoline series.

8. A photographic gelatino-silver-halide emulsion sensitized with a compound represented by the following formula:

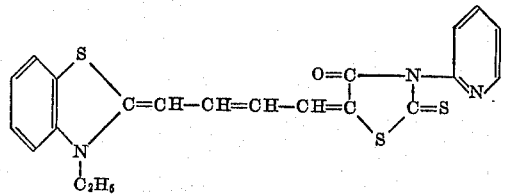

9. A photographic gelatino-silver-halide emulsion sensitized with a compound represented by the following formula:

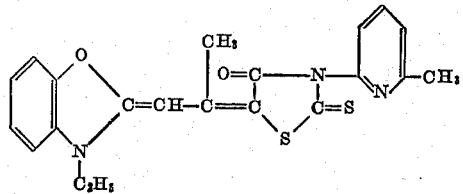

10. A photographic gelatino-silver-halide emulsion sensitized with a compound represented by the following formula:

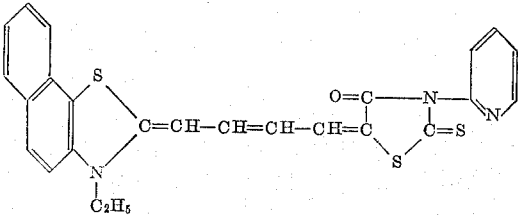

11. A photographic gelatino-silver-halide emulsion sensitized with a compound represented by the following formula:

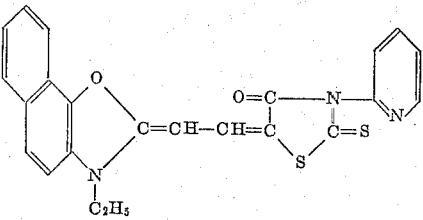

12. A photographic gelatino-silver-halide emulsion sensitized with a compound represented by the following formula:

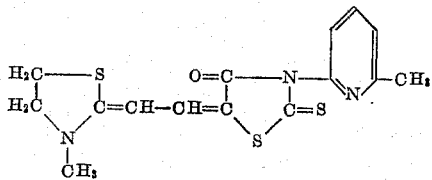

References Cited in the file of this patent
UNITED STATES PATENTS

| | | |
|---|---|---|
| 2,186,608 | Keys | Jan. 9, 1940 |
| 2,493,747 | Brooker et al. | Jan. 10, 1950 |
| 2,493,748 | Brooker et al. | Jan. 10, 1950 |
| 2,504,615 | Anish | Apr. 18, 1950 |
| 2,692,829 | Aubert et al. | Oct. 26, 1954 |